United States Patent Office 3,405,535
Patented Oct. 15, 1968

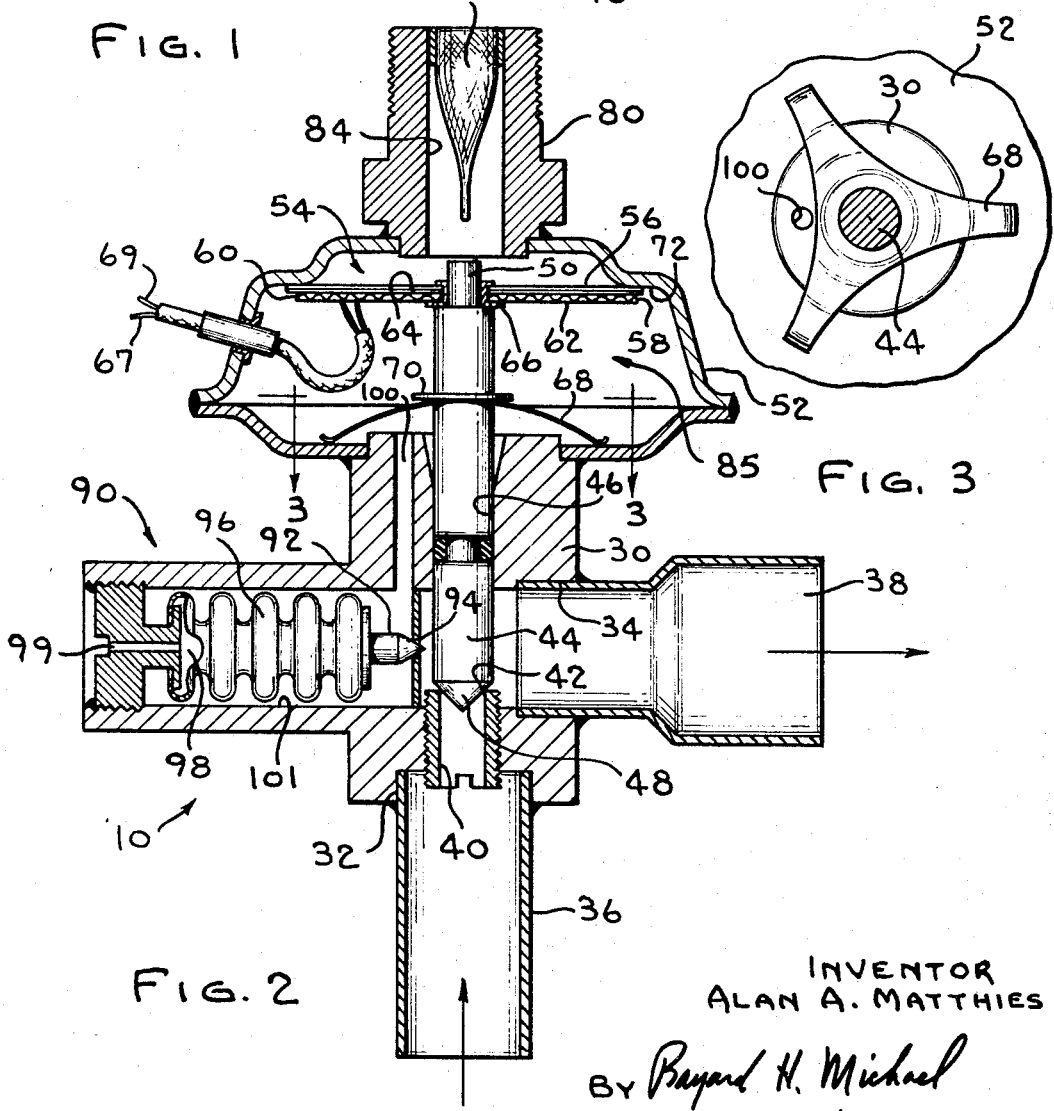

3,405,535
TEMPERATURE CONTROLLED FLOW CONTROL DEVICE AND REFRIGERATION SYSTEM INCLUDING SUCH DEVICE
Alan A. Matthies, Milwaukee, Wis., assignor, by mesne assignments, to Controls Company of America, Melrose Park, Ill., a corporation of Delaware, organized in 1966
Filed Feb. 10, 1966, Ser. No. 536,495
13 Claims. (Cl. 62—202)

ABSTRACT OF THE DISCLOSURE

An expansion valve is provided with a temperature controlled operator which determines the flow through the valve on the basis of heat transfer between the operator and its ambient, the ambient of the operator being determined by the condition of refrigerant flowing in the system. Communication between the operator and the refrigerant system is achieved through a single passage which provides both an inlet to and an outlet from the operator. In its more specific aspects, a fine mesh wire screen is provided in the single passage to retard flow of liquid to the operator so that the operator is somewhat isolated from momentary abnormal conditions which might occur in the evaporator. Also, an auxiliary passage is provided between the main flow passage of the valve and the operator. The auxiliary passage is controlled by a valve which responds to the pressure in the system and will open the auxiliary passage in the event of an abnormal pressure condition in the system and by so doing diverts liquid refrigerant directly to the operator to cool the operator and shut the valve.

This invention relates to fluid flow control devices of the bimetal-operated type and specifically relates to an improvement in valves of the type disclosed and claimed in Patent 3,205,675 of Alan A. Matthies entitled, "Valve With Bimetal Means for Refrigeration System," and assigned to the assignee of this application.

A general object of this invention is to provide a flow control device of relatively simplified construction which is capable of controlling fluid flow on the basis of a change in state of the fluid being controlled as well as in response to its temperature and rate of flow.

A further, more specific, object of this invention is to eliminate, or substantially reduce, the tendency of a flow control device of this type to "hunt" upon system start-up or upon the occurrence in the system of conditions similar to those encountered on start-up.

Another, more specific, object of this invention is to provide an improved valve for controlling refrigerant flow in a refrigeration system; and, moreover, to provide a valve which will respond both to temperature and change of state of the refrigerant which is capable of maintaining a desired degree of superheat in the system and/or which will automatically terminate system flow in the event of an overload on, or an abnormal condition occurring in, the system.

Although this invention may have application in other fields, it will be discussed in connection with a refrigeration system. For the achievement of the above stated and other objects, this invention contemplates the provision of a thermostatic expansion valve having a valve operator which will respond both to a change in temperature and/or the state of the media being controlled, e.g., it will be respond to a change in temperature of the refrigerant in a refrigeration system and also to a change of the refrigerant from a gaseous to a liquid state. The valve operator is initially actuated to establish a base flow rate through the valve and thereafter the valve operator is exposed to the refrigerant at a point downstream of the evaporator, i.e., in the suction line of the compressor. The valve operator is temperature controlled and responds to the temperature and state of the refrigerant as it leaves the evaporator to modulate the valve about its base opening in accordance with the condition of the refrigerant at that point, more particularly, in accordance with the heat transfer between the valve operator and refrigerant. It is preferred that the valve operator be exposed to the refrigerant through a single passage which provides effective communication between the valve operator and the refrigerant without the necessity for directing refrigerant through the valve operator. The single passage not only simplifies the arrangement through which the valve operator communicates with the refrigerant but also tends to better isolate the valve operator from normal refrigerant flow while permitting the refrigerant to effect the ambient of the operator which in turn determines the operation of the valve operator with respect to the valve. This isolation of the valve operator is particularly desirable in that it renders the valve operator more responsive to a change in state of the refrigerant which enhances the ability of the valve operator to maintain a superheat condition at any desired point in the suction line between the evaporator and compressor.

In accordance with other, more specific, aspects of this invention an arrangement is provided for retarding the flow of liquid refrigerant through the passage providing the communication between the valve operator and the flow line so that the operator will not respond to a temporary or abnormal amount of refrigerant flow in the line, such as on system start-up, and turn off the flow of refrigerant prematurely or mistakenly. Furthermore, an arrangement is used in combination with the valve operator which monitors system flow in order to detect an abnormal internal system condition which may be resulting from, for example, an overload on the system. For example, such an arrangement can be made to respond to suction pressure and operates in response to an increase in suction pressure over a predetermined valve to open a path for the refrigerant bypassing the normal valve flow path and being channeled directly to the operator to rapidly shut off the valve and allow the system to clear itself of the abnormal condition.

Other objects and advantages will be pointed out in, or be apparent from, the specification and claims, as will obvious modifications of the embodiment shown in the drawings, in which:

FIG. 1 is a schematic drawing of a refrigeration system incorporating a flow control device constructed in accordance with this invention;

FIG. 2 is a section through the flow control device; and

FIG. 3 is a section view taken generally along line 3—3 of FIG. 2.

With particular reference to the drawings, fluid flow control device 10, specifically a thermostatic expansion valve, is illustrated as incorporated in a refrigeration system; however, as was stated above it will be appreciated that the control device of this invention is not necessarily limited to use in any specific type of system. Before entering into a specific description of the construction of the control device, its relationship in the refrigeration system will be described. The system includes a compressor 12 of conventional construction, a condenser 14 connected to the compressor through conduit 16 and evaporator 18 connected to the condenser through conduits 20, 22 and valve portion 24 of the flow control device. The flow control device also includes an operator portion 26 connected to suction line 28 extending between the evaporator and the compressor so that, in a manner to be described more completely hereinafter, the flow of refrigerant through valve portion 24 is controlled in accordance with the temperature and/or state of the refrigerant as it leaves the evaporator and is passing through suction line 28.

With this brief description of the refrigeration system in mind, the construction of the flow control device will be described. Valve portion 24 of the flow control device comprises a body section 30 including relatively spaced inlet and outlet openings 32 and 34. Inlet coupling 36 is fixed to body section 30 at the inlet opening and, similarly, outlet coupling 38 is fixed to the body section at outlet opening 34 to thereby provide means for connecting the flow control device in a fluid flow system such as that illustrated in FIG. 1. A generally tubular insert 40 is received in the body portion and defines an orifice between the inlet and outlet openings. End 42 of the inserts provides a valve seat intermediate the inlet and outlet openings and valve member 44 is received in a bore 46 in body section 30 for sliding movement with respect to the body section and valve seat 42 to move conical face 48 of the valve member into and out of engagement with the valve seat to open and close the orifice to flow through the flow control device. Valve member 44 is movable to achieve any desired degree of opening of the flow control device to produce a desired flow rate.

Movement of valve member 44 with respect to the valve seat is effected by operator 26. End 50 of valve member 44 extends into housing 52 of the operator and carries a temperature-controlled operating assembly 54. Operating assembly 54 includes a bimetal element 56 and a heater 58 which can consist of any suitable heater wire, for example, a length of Nicrome wire 60 sandwiched between wafers 62 and 64 made of any suitable electrical insulating but heat conducting material. The elements of assembly 54 are held together by a rolled eyelet 66 which is pressed onto end 50 of the valve member so that operating assembly 54 and the valve member are connected for joint movement. A suitable electrical connection is made to the Nicrome wire through a pair of electrical terminals 67 and 69.

A bowed spring 68 is seated between housing 52 and a flange 70 fixed on valve element 44 and cooperates with operating assembly 54, which engages an inner shoulder 72 of housing 52, to normally position valve member 44 to close the flow control device to flow past the seat 42. Energization of Nicrome wire 60 heats bimetal strip 56 causing it to bow upwardly and lift conical valve face 48 off of seat 42 to open the orifice provided by insert 40 to permit flow through the flow control device. Energization of the heater can be effected by any suitable control arrangement. For example, terminals 67 and 69 can be connected to a suitable source of alternating current 74 with the control circuit including an on-off switch 76 and a variable resistance 78 which is effective to control the amount of current flowing through the heater to in turn control the heater temperature and the amount of bowing of the bimetal element. This arrangement provides control over the degree of opening of the flow control device to permit establishing an initial or base flow rate through the control device.

The arrangement described to this point effectively provides for establishing a desired volume of flow through the system. It is also desirable that flow control device 10 be capable of automatically adjusting to compensate for changes in the load on the system. The condition of the refrigerant leaving the evaporator is one of many possible indicia which may be used to monitor the load, for example refrigerant in a liquid state leaving the evaporator coil indicates that an excessive amount of refrigerant is being supplied to the evaporator than is required to handle the load on the system and, conversely, refrigerant in a gaseous state leaving the evaporator at a temperature above a preselected superheat temperature indicates that too little refrigerant is being furnished to the coil for a given load. The flow control device constructed in accordance with this invention utilizes the condition of the refrigerant leaving the evaporator coil, or in the suction line, as a basis for controlling the amount of refrigerant supplied to the evaporator and to thereby control the amount of cooling afforded by the system. Flow control device 10 is connected in the suction line through a simple, single coupling 80 which connects in the suction line through a suitable connector 82 shown schematically in FIG. 1. Coupling 80 is connected to housing 52 of the controller assembly and provides communication between operating assembly 54 and the suction line through a single passage 84 formed in coupling 80. With this arrangement the refrigerant leaving the evaporator coil flows across passage 84 and operating assembly 54 is thereby exposed to both the temperature and state of the refrigerant. More particularly, the temperature within chamber 85, and ambient operating assembly 54, will vary in accordance with the temperature of the refrigerant flowing in the suction line and the opening of valve element 44 will modulate about the initial base opening in accordance with heat dissipation between operating assembly 54 and its ambient. In the event refrigerant in a liquid state is flowing across passage 84 the liquid refrigerant will be delivered to and cool operating assembly 54 tending to close valve element 44 on seat 42 to thereby compensate for an oversupply of refrigerant to the evaporator which may be indicated by the amount of liquid refrigerant leaving the evaporator and entering operator portion 26. It will be appreciated that the dissipation of heat from the operating assembly will be greater when subjected to liquid refrigerant than when exposed to refrigerant in a gaseous state and will thereby effect a more rapid adjustment in the system to compensate for liquid refrigerant flowing from the evaporator coil. This more rapid adjustment is desirable because compensation to alleviate a liquid refrigerant condition at the evaporator exit should be rapidly compensated for to prevent liquid from entering the compressor. In the sense that the flow control device of this invention responds to the temperature and state of the refrigerant in the suction line this invention is similar to that disclosed and claimed in the above mentioned copending application; however, this invention is an improvement over the construction of that application in that it provides a more simple communication between the controller assembly and the suction line and also better isolates operating assembly 54 for more accurate response, particularly to a change in state of the refrigerant in the suction line. The response of operating assembly 54 to the temperature and state of the refrigerant is more completely described in the above mentioned copending application and reliance is hereby placed on the disclosure of that application for a more complete description of the operation of the valve operator.

The flow control device will control refrigerant in both a liquid and gaseous state and will provide any degree of superheat at any selected point in the suction line. Under a normal load condition the flow of fluid refrigerant to the evaporator will be such that virtually all of the refrigerant will just boil off through the coil length in the evaporator but a small trickle of liquid refrigerant will flow across passage 84. Where the amount of liquid refrigerant flowing across the passage increases above the normal, the liquid refrigerant is delivered to the operating assembly along the walls of passage 84 to cool the operating assembly and operate the valve to reduce the flow of refrigerant and compensate for an excessive amount of refrigerant being delivered to the evaporator coil. At this point it should be noted that the flow control device will operate effectively when positioned below the suction line so that liquid refrigerant travels to operating assembly 54 by gravity and also when positioned above the line where-upon liquid refrigerant will travel to the operating assembly by capillary action.

Should a large amount of refrigerant in a liquid state flow across passage 84, the refrigerant will flow directly to heater assembly and a rapid compensation and perhaps a complete closing of valve 44 may occur. In some instances this rapid compensation may have an adverse effect on the overall operation of the system, for example, on start-up or in the event of a temperary condition resulting in a "slug" of refrigerant flowing past passage 84 which could prematurely shut down the system. The problem occurring on start-up is perhaps the most likely to be encountered under normal system operation and therefore it will be described. On start-up, i.e., when valve 44 is initially opened to provide the base flow rate in response to a load on the system, there is a tendency for the initial supply of refrigerant to flow through the evaporator coil without completely vaporizing therefore resulting in a large amount of liquid refrigerant passing across passage 84. This over-feeding of the evaporator coil results in a rapid and possibly complete closure of the valve thereby interrupting flow to the evaporator coil which has the effect of starving the coil. Because of the demand on the system the valve will be re-opened wide and again overfeed the evaporator and bring about another rapid closing of the flow control device. This alternate overfeeding and underfeeding produces a "hunting" condition upon start-up and, although the hunt will eventually be evened out and normal operation established, the system is subjected to a prolonged, inefficient period of operation during hunting. Obviously this same "hunting" condition could occur as a result of a temporary or transient high liquid condition appearing across passage 84, however, it will in all probability not be as severe as that encountered on start-up.

To alleviate this condition the valve control mechanism of this invention proposes to counteract this tendency to flood the heater. More particularly, a fine mesh screen 86 is placed across the opening of passage 84 to the suction line. The fine mesh screen prevents a rapid inrush of liquid refrigerant to operating assembly 54 while at the same time maintaining the desirable operation of directing a fine trickle of refrigerant to the operating assembly thereby permitting the operating assembly to modulate the valve toward closing where desired but in a less violent fashion and preventing excessive overshoot and undershoot and consequential flooding and starving of the evaporator coil. This arrangement will eliminate the "hunt" condition occurring upon initial start-up or, at least, will reduce the "hunt" period and rapidly damp out any overshoot and undershoot conditions which may arise.

During operation the flow control device will respond to an increased load on the evaporator coil by increasing the valve opening to deliver an increased amount of refrigerant to the coil. However, as more refrigerant is called for the compressor is called upon to deliver correspondingly more liquid refrigerant to the evaporator. This automatic increase in amount of refrigerant delivered will continue as the load increases until the compressor is incapable of satisfying the needs of the particular load on the system. When an overload condition is indicated, it is desirable that the system automatically shut down rather than to attempt to operate under an overload condition which it cannot satisfy. To achieve automatic shut down the flow control device of this invention incorporates a shut down or "knock-off" assembly 90 which responds to the overload condition to open an auxiliary flow path for the liquid refrigerant. The auxiliary flow bypasses the evaporator and channels liquid refrigerant directly to the operator assembly, past operating assembly 54 and into the suction line through coupling 80. This has a rapid cooling effect on the operating assembly and shuts down the flow control device to terminate system operation. More particularly, the shut down or "knock-off" arrangement illustrated in connection with the preferred embodiment of this invention includes a needle valve 92 seated in a valve port 94 which opens into the flow path through valve assembly 24. Needle valve 92 is supported on a bellows 96 the interior 98 of which is open to atmosphere through port 99. The seating force exerted on needle valve 92 is the combined force of atmospheric pressure in chamber 98 and the spring force of bellows 96. Bellows 96 is supported in chamber 101 which is open to chamber 85 through passage 100 and is at suction line pressure. The seating force exerted on the needle valve by the bellows, and atmospheric pressure in interior 98, is selected so that valve 92 remains seated under normal operating conditions but in the event that suction line pressure should exceed a predetermined maximum pressure, thereby indicating an overload condition on the evaporator, the increased suction line pressure opens the needle valve and correspondingly opens passage 100 to refrigerant flow so that the refrigerant is transported through the operator assembly to cool operating assembly 54. Accordingly, the flow control device will automatically respond to an overload condition and shut down the system allowing it to return to a normal operating condition, valve 92 again closing to allow normal system flow to be re-established. Although the illustrated embodiment of assembly 90 is illustrated as being responsive to suction line pressure it will be appreciated that it could be made to respond to other conditions which are indicative of an overload on the system, e.g., this could be electrically controlled and responsive to evaporator fin temperature or could be made to respond to evaporator inlet pressure.

Although but one embodiment of the present invention has been illustrated and described, it will be apparent to those skilled in the art that various changes and modifications may be made therein without departing from the spirit of the invention or from the scope of the appended claims.

I claim:
1. A fluid flow control device comprising, in combination,
   means defining a first fluid flow passage through said device,
   means defining an orifice in said first passage,
   valve means mounted in said device for movement toward and away from said orifice for opening and closing said orifice,
   means biasing said valve means in one direction relative to said orifice,
   temperature controlled operating means including temperature responsive means connected directly to said valve means and operative in response to an increase in temperature to move said valve means against said bias and also including means in heat transfer relationship with said temperature responsive means for heating said temperature responsive means to move said valve means and establish a base opening of said valve means and a predetermined flow rate through said orifice, said operating means further operative to modulate said valve means about said base opening in accordance with the heat transfer between said operating means and its ambient,
   means defining a chamber for said operating means isolated from said first flow passage,
   and means defining a single passage into said chamber to said operating means isolated from and independent of said first passage and adapted to be connected in a fluid flow line, said single passage forming both an inlet to and outlet from said chamber to provide operative communication between said operating means and said fluid flow line through said single passage,
   whereby said fluid flow control device is adapted to be connected in a flow system with said valve means operative to control flow through said system and said single passage can be connected in said system at a position spaced from said valve means so that flow through said orifice is controlled in accordance with the state and/or temperature of the fluid flowing past said single passage.

2. The fluid flow control device of claim 1, wherein said single passage is defined by coupling means forming the inlet to and outlet from said chamber and operative to connect said chamber to a fluid flow line, said single passage providing operative communication between said temperature responsive means and said fluid flow line through said single passage.

3. The fluid flow control device of claim 2 including, means defining an auxiliary passage from said first passage to said chamber,
auxiliary valve means in said auxiliary passage,
and means for connecting said auxiliary valve means for response to the condition of fluid flowing in said system and operative to operate said auxiliary valve means to normally close said auxiliary passage and operate said auxiliary valve means to open said auxiliary passage for direct flow of fluid to said chamber and said operating means in response to the occurrence of a predetermined condition of the fluid flowing through said system.

4. The fluid flow control device of claim 3 wherein said auxiliary valve means is pressure responsive and exposed to the pressures in said chamber and said first passage and operative to open said auxiliary passage for direct flow of fluid to said chamber in response to a predetermined pressure increase in said chamber.

5. The fluid flow control device of claim 1 including means extending across said single passage and characterized by being capable of retarding flow of a relatively high volume of liquid through said single passage while permitting flow of a relatively small amount of liquid through said single passage for control purposes.

6. The fluid flow control device of claim 5 wherein said means extending across said single passage comprises a fine mesh screen.

7. A fluid flow control device comprising, in combination,
means defining a first fluid flow passage through said device,
means defining an orifice in said first passage,
valve means mounted for movement toward and away from said orifice for opening and closing said orifice,
temperature controlled operating means connected to said valve means and operative to establish a base opening of said valve means and a predetermined flow rate through said orifice, said operating means further operative to modulate said valve means about said base opening in accordance with heat transfer between said operating means and its ambient,
means defining a second passage to said operating means for connecting said operating means to a fluid flow system so that the ambient of said operating means varies in accordance with the condition of the fluid flowing in said system,
and a fine mesh screen in said second passage characterized by being capable of retarding flow of a relatively high volume of liquid through said second passage while permitting flow of a relatively small amount of liquid through said second passage for control purposes,
whereby said fluid flow control device is adapted to be connected in a flow system with said valve means controlling fluid flow through said system and said operating means can be connected in said system at a position spaced from said valve means so that fluid flow through said orifice and said system is controlled in accordance with the state and/or temperature of the fluid to which said operating means is exposed.

8. The combination of claim 7 wherein said fluid flow control device is connected in a refrigeration system including a compressor, condenser and evaporator,
said first passage is connected between said condenser and evaporator with said valve means controlling flow to said evaporator,
and said second passage is connected in said system on the outlet side of said evaporator so that said operating means ambient corresponds to the temperature and/or state of the fluid leaving the evaporator and flowing to the compressor.

9. A fluid flow control device comprising, in combination,
means defining a first fluid flow passage through said device,
means defining an orifice in said first passage,
first valve means mounted in said device for movement toward and away from said orifice for opening and closing said orifice,
temperature controlled operating means connected to said valve means and operative to move said valve means to establish a base opening of said valve means and a predetermined flow rate through said orifice, said operating means further operative to modulate said valve means about said base opening in accordance with the heat transfer between said operating means and its ambient,
means defining a second passage to said operating means independent of said first passage so that said operating means can be connected to respond to the temperature and/or state of the fluid at said second passage and is effective to modulate said valve means about said base opening in accordance with the state and/or temperature of said fluid,
means defining an auxiliary passage from said first passage to said operating means,
and auxiliary valve means responsive to the condition of the fluid flow controlled by said first valve means and operative to normally close said auxiliary passage and open said auxiliary passage for direct flow of fluid to said operating means in response to the occurrence of a predetermined condition of said flowing fluid.

10. The fluid flow control device of claim 9 wherein said auxiliary valve means in pressure responsive and including means connecting said auxiliary valve means to respond to the pressure of said flowing fluid so that said auxiliary valve means responds to and is effective to open said auxiliary valve means in response to the occurrence of a predetermined pressure.

11. The fluid flow control device of claim 10 in a refrigeration system including a compressor, condenser and evaporator,
said first passage is connected between said condenser and evaporator with said first valve means controlling flow to said evaporator,
said second passage connected in said system at a point on the outlet side of said evaporator,
and said auxiliary valve means is connected to respond to system pressure.

12. A fluid flow control device connected in a refrigeration system including a compressor, condenser and evaportator, said fluid flow control device comprising, in combination,
means defining a first fluid flow passage through said device and connected between said condenser and evaporator,
means defining an orifice in said first passage,
valve means mounted in said device for movement toward and away from said orifice for opening and closing said orifice,
said first passage being connected between said condenser and evaporator with said valve means controlling flow of refrigerant to said evaporator,
temperature controlled operating means connected to said valve means and operative to establish a base opening of said valve means and a predetermined flow rate through said orifice, said operating means further operative to modulate said valve means about said base opening in accordance with the heat transfer between said operating means and its ambient, means defining a chamber for said operating means isolated from said first flow passage, and means defining a single passage into said chamber to said operating means isolated from and independent of said first passage and connected in said refrigeration system, said single passage forming both an inlet to and outlet from said chamber to provide operative communication between said operating means and said refrigeration system through said single passage, whereby said fluid flow control device is connected in said refrigeration system with said valve means operative to control flow through said system and said single passage is connected in said system so that flow through said orifice is controlled in accordance with the state and/or temperature of the fluid flowing in said system past said single passage.

13. The combination of claim 12 wherein said single passage is connected in said system on the outlet side of said evaporator with said operating means controlling said valve means in accordance with the state and/or temperature of the fluid leaving said evaporator.

References Cited

UNITED STATES PATENTS

| | | | |
|---|---|---|---|
| 2,400,335 | 5/1946 | Dodson | 62—223 XR |
| 2,453,439 | 11/1948 | Hubbard | 62—223 XR |
| 2,520,191 | 8/1950 | Aughey et al. | 62—225 |
| 2,539,062 | 1/1951 | Dillman | 62—202 XR |
| 2,564,421 | 8/1951 | Carter | 62—211 |
| 3,119,559 | 1/1964 | Heidorn | 62—224 XR |
| 3,205,675 | 9/1965 | Matthies | 62—202 |

MEYER PERLIN, *Primary Examiner.*